United States Patent [19]

Balevski et al.

[11] 4,092,385
[45] May 30, 1978

[54] METHOD OF PRODUCING MOLDED PARTS WITH A SMOOTH NONCELLULAR SKIN AND A CELLULAR CORE FROM FOAMABLE THERMOPLASTIC MATERIAL

[75] Inventors: Angel Tonchev Balevski; Ivan Dimov Nikolov, both of Sofia; Evgeni Hristov Mateev, Pleven; Todor Kostadinov Trifonov, Pleven; Vassil Vladimirov Kojuharov, Pleven, all of Bulgaria

[73] Assignee: Institute Po Metaloznanie I Technologia Na Metalite, Sofia, Bulgaria

[21] Appl. No.: 634,527

[22] Filed: Nov. 24, 1975

[30] Foreign Application Priority Data

Nov. 25, 1974 Bulgaria .................................. 28282

[51] Int. Cl.$^2$ .............................................. B29D 27/00
[52] U.S. Cl. ...................... 264/45.5; 264/88; 264/328; 264/DIG. 14; 264/DIG. 83
[58] Field of Search ................... 264/DIG. 83, 51, 54, 264/45.5, 48, DIG. 14, 88, 328

[56] References Cited

U.S. PATENT DOCUMENTS

| | | | |
|---|---|---|---|
| 2,530,289 | 11/1950 | Cook | 264/DIG. 83 |
| 2,829,117 | 4/1958 | Lindemann | 264/DIG. 83 |
| 3,029,472 | 4/1962 | Fischer | 264/DIG. 83 |
| 3,058,161 | 10/1962 | Beyer et al. | 264/DIG. 83 |
| 3,268,635 | 8/1966 | Kraus et al. | 264/DIG. 83 |
| 3,694,529 | 9/1972 | Josephsen et al. | 264/DIG. 83 |
| 3,773,873 | 11/1973 | Spaak et al. | 264/DIG. 83 |
| 3,776,989 | 12/1973 | Annis et al. | 264/DIG. 83 |

*Primary Examiner*—Philip Anderson
*Attorney, Agent, or Firm*—Karl F. Ross

[57] ABSTRACT

A method of injection molding foamed articles wherein, after the mold is closed and while the mold is held closed, a gas counterpressure is generated within the mold cavity against which a portion of the foamable resin is injected under a pressure which prevents foaming. Thereafter, a shape-forming element adapted to be retracted to be flush with a wall of the mold cavity in the final phase thereof, is advanced to force the nonfoamed material, still against the gas counterpressure, into the remainder of the cavity. After a skin has formed, on the mass within the mold cavity the latter element is retracted to permit foaming, preferably after foaming has been initiated by allowing a portion of the foamable mass to recede into the injection cylinder during the inception of the foaming process.

6 Claims, 8 Drawing Figures

METHOD OF PRODUCING MOLDED PARTS WITH A SMOOTH NONCELLULAR SKIN AND A CELLULAR CORE FROM FOAMABLE THERMOPLASTIC MATERIAL

FIELD OF THE INVENTION

This invention relates to a method of injection molding bodies with a smooth noncellular skin and a cellular core.

BACKGROUND OF THE INVENTION

Methods are known for the production of molded articles with a noncellular skin and a cellular core from polymer materials by injecting a gas into the melt or by the use of polymer material mixed in advance with a blowing agent. In both cases, as a result of the partial foaming which begins during the filling of the mould, the obtained articles have a characteristically rough surface.

Attempts have been made to avoid this disadvantage and to obtain parts with smooth surfaces. Some of these methods use the rheological properties of polymer melts to make it possible for the material last introduced into the mold to reach the zones most remote from the sprue. In one of these methods, a smooth surface is achieved by initially introducing into the mold a plastified material which does not contain any blowing agent, and thereafter introducing a material containing a blowing agent. Other methods avoid premature foaming by initially providing a gas pressure in the mold cavity which is higher than the partial pressure of the gaseous products evolved upon the decomposition of the blowing agent. Foaming in these cases is effected by permitting part of the foamable material to expand into a cylinder or by increasing the volume of the mold cavity.

A basic disadvantage of these methods is that they are applicable in practice only for relatively thick-walled articles, since the withdrawal of the foamable material in the case of thin-walled articles is difficult to achieve; and in cases in which foaming occurs as a result of an increase of the mold volume by partial opening of the mold, the filling of the mold is also difficult because of the small wall-thickness. Large injection and clamping forces are necessary and lead to the use of bulky machines. The filling of the mold in the case of thin-walled parts is also complicated as a result of the difficulty of removing the gases from the mold cavity, as well as by the cooling effect of these gases on the flow front of the foamable material which is introduced into the mold.

The apparatus for practicing these methods generally comprise additional plastifying and injecting units, as well as suitable nozzles. The disadvantage of these devices are then limitations with regard to the shape of the molded articles, the comparatively high relative weight, and the need for the aforementioned additional plastifying and distributing units.

OBJECT OF THE INVENTION

It is therefore an object of the present invention to avoid the disadvantages of the known methods and devices, and to provide a method and a device for the injection moulding of relatively thin-walled parts with a smooth noncellular skin and a cellular core with a low relative weight by using machines with relatively low mold-clamping forces.

SUMMARY OF THE INVENTION

This object is achieved, according to the invention, by connecting movable shape-forming elements with a suitable pressing system, which can act on the foamable material injected into the mold, regardless of the position of the mold as determined by the action of the system for closing and opening of the mold, and regardless of the position of the foamable material as determined by the action of the injection system.

Before introducing the foamable material, the mold cavity is filled with a gas, heated to a temperature higher than the ambient temperature, and at a pressure varying by vibrations of predetermined amplitude and frequency, which is higher than the partial pressure of the gaseous phase of the foamable material.

After filling of the mold cavity with foamable material, conditions are provided for the withdrawal of part of this material back into the injecting or into another cylinder. The initial position of the movable shape-forming elements corresponds to a volume, which is equal or nearly equal to the volume of the end product. After filling the mold with gas and producing a determined gas pressure, called the counter-pressure hereinafter, a determined charge of foamable material is injected into the mold cavity, which fills the mold cavity only partially. Thereafter or at the same time the movable shapeforming elements are moved forward by a pressing system and push the foamable material until the mold is totally filled.

During the latter step, both mold halves remain pressed together at the parting plane and the mold cavity remains sealed; the gas counter-pressure necessary to avoid any premature foaming is maintained. After the total filling of the mold cavity and the formation of a noncellular smooth surface, in the cases when this would be necessary (for example in articles of complex shape with local thick walls) conditions are provided for the egression of foamable material back into the injecting cylinder or into another cylinder, this inducing foaming in the core of the article.

After egression of part of the foamable material, the connection between the mould cavity and the aforementioned cylinders is interrupted and by moving the movable shape-forming elements the volume of the mould cavity is increased, thereby permitting the foaming of the foamable material in the core of the molded article. The motion of the movable shape-forming elements in direction of reducing the mould cavity volume can be effected simultaneously with the injection of the foamable material, while the motion of the shape-forming elements in the opposite direction can be effected simultaneously with the egression of part of the foamable material in the injecting or in another cylinder.

The movable shape-forming elements can, in accordance with the present invention, initially be in a position corresponding to a volume smaller than the volume of the end product; after the filling of the mold cavity with foamable material and releasing the gas counter-pressure, they are moved so as to increase the volume of the mold cavity and provide conditions for foaming in the core of the molded article.

The device to effect the method in accordance to the present invention comprises a system for closing and opening the mold, an injecting system, a system for moving and control of the aforementioned, and a mould with movable shape-forming elements. To the movable or fixed plate of the system for opening and closing the mold there is attached a pressing system, comprising one or more hydraulic cylinders, the movable parts of which are rigidly fastened to the movable shape-forming elements, and they can move, thus increasing or reducing the volume of the mold cavity, without any change in the position of both mold halves, which remain pressed one against the other under the action of the system for closing and opening of the mold. The mold cavity is connected by means of conduits, pipes and distributing devices with the system for producing the gas counter-pressure, which comprises electric, steam or other gas-heating devices, as well as elements for producing pressure oscillations.

The pressing system comprises of one or more hydraulic cylinders, attached between two base plates. To the movable parts of these cylinders there is fastened a plate, which is guided by some of the elements connecting both base plates and to which there can be fastened the movable shape-forming elements. The relation between the clamping force and the pressing force is close to the relation of the projection of the whole molded article and the movable shape-forming elements.

In the molding of articles with a smooth noncellular skin and a cellular core, in accordance with the present invention, the filling of the mold can be effected through a thickness, which is greater or close to the thickness of the end product, with the simultaneous action of an oscillating gas pressure by a gas heated to a determined temperature. At the final instant of the filling of the mold the injection pressure no longer predominates but there is a considerably lower pressing pressure, and as a result, lower mold clamping forces will be sufficient. The flow of the foamable material through a thickness, greater or close to the thickness of the end-product, as well as the action of the heated gas and the oscillations of the pressure on the front of the foamable material filling the mold and on the mold walls provide for the achievement of high relative "flow path — wall-thickness" and the molding of relatively thin-walled articles with smooth surfaces. The pulling back of the movable shape-forming elements at the end of the process cycle allows molded articles of very low density to be made.

An advantage of the invention is the possibility to mould large-sized thin-walled articles with a smooth nonporous skin and a cellular core with a low relative weight by using a machine with small forces for mould clamping. This method makes also the molding of thick-walled articles possible.

BRIEF DESCRIPTION OF THE DRAWING

For a better understanding of the invention, its operating advantages and specific objects attained by its use, reference should be made to the accompanying drawing and description relating to preferred embodiments of the invention. In the drawing.

SPECIFIC DESCRIPTION

Figure 1:
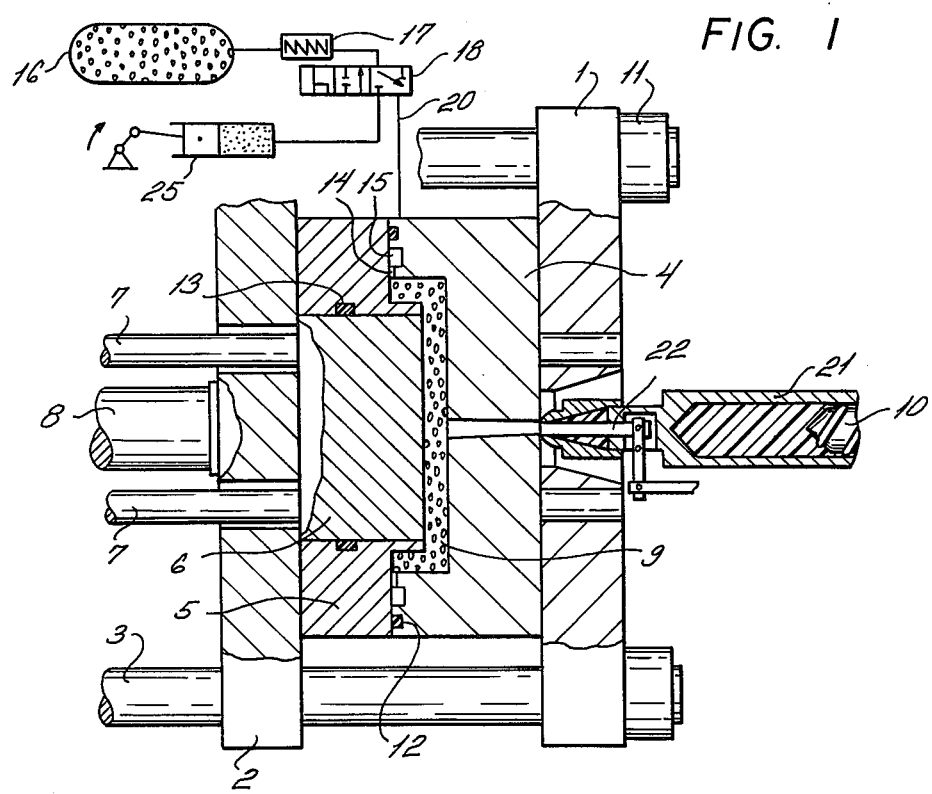
FIG. 1 is a partial vertical cross-sectional view of the mold, shown in the first phase of the method of the invention, i.e. the production of a gas counter-pressure.

The mold shown in FIG. 1 comprises a fixed mold half 4 attached to a plate 1 and a movable mold half 5 attached to a plate 2, inside which there are located shape-forming elements 6, which are individually driven by rods 7. The mold is provided with sealing elements 12 and 13 which seal the mold cavity 9 when it is filled with gas as well as with conduits or channels 14 and 15 serving for producing a gas counterpressure inside the mold cavity 9 and the removal of the gases. The production of a gas counter-pressure in the mold cavity occurs by its connection with the gas reservoir 16 by means of a heating element 17, distributing valve 18 and conduits 20. To the inlet opening of the mold cavity there is pressed the injection unit 21, which is provided with a shut-off valve 22.

On the foamable material, which contains a blowing agent, we maintain a constant pressure by means of the injection piston 10 this presence is higher than the internal pressure of the blowing agent.

The mold cavity is connected by means of the distributing valve 18 with a pressurized reservoir 16, and through the heating element 17, the valve 18, the pipes 20 and the conduits channels or grooves 14 and 15; in the mold cavity a gas pressure is produced, which is called counter-pressure. The value of this gas counter-pressure is set by means of a regulating valve (not shown in the drawing) at a value which is usually higher than the partial pressure of the gaseous products of the blowing agent, and lower than injection pressure. The heating of the gas occurs when it passes through the heating element 17.

Figure 2:
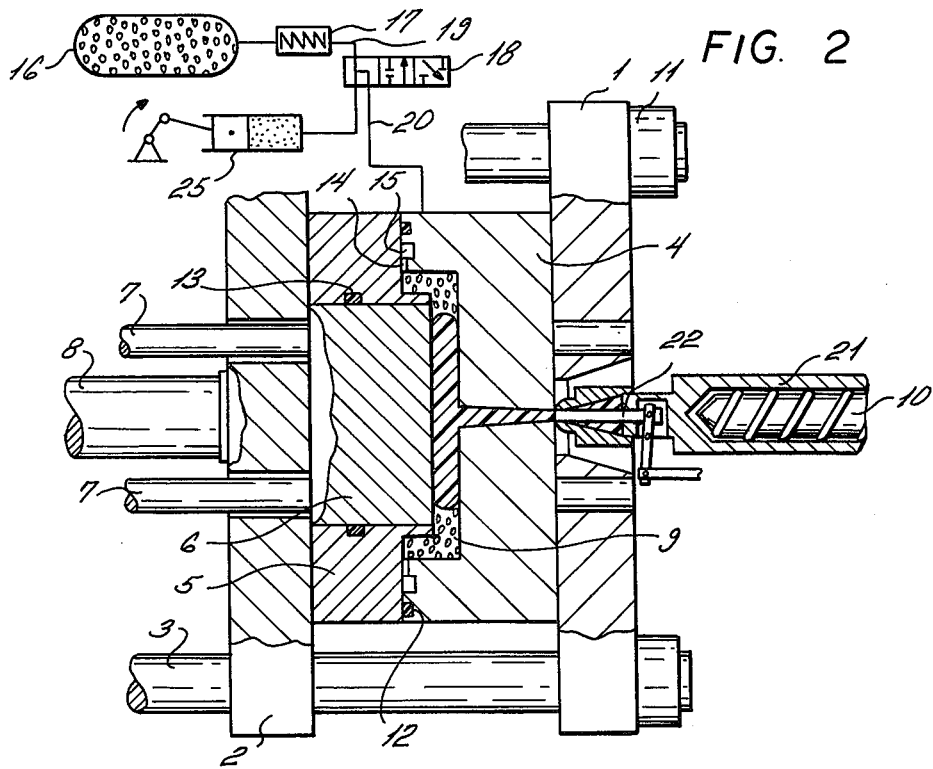
FIG. 2 shows the same mold of FIG. 1 in the second phase of the method, i.e. the injection of the charge of foamable material in the mould cavity.

After a gas counter-pressure has been produced, the second phase of the method of the invention begins. The shut-off valve 22 is retracted and the mold cavity 9 is filled with foamable material 23; however, foaming cannot occur because the gas counter-pressure is still higher than the partial pressure of the blowing agent. The injection piston 10 moves forward and the foamable material partially fills the mold cavity 9, pushing out part of the gas through the channels 14 and 15, the valve 18 and the pipes 20 back into the gas reservoir 16, while the magnitude of the counter-pressure remains constant and corresponds to the value set by the regulating valve. The return of the gas to the gas reservoir makes it possible to carry out the process with a minimum consumption of pressurized gas. The last moment of the second phase is shown in FIG. 2, i.e. the mold cavity is only partially filled with the expandable material.

Figure 3:
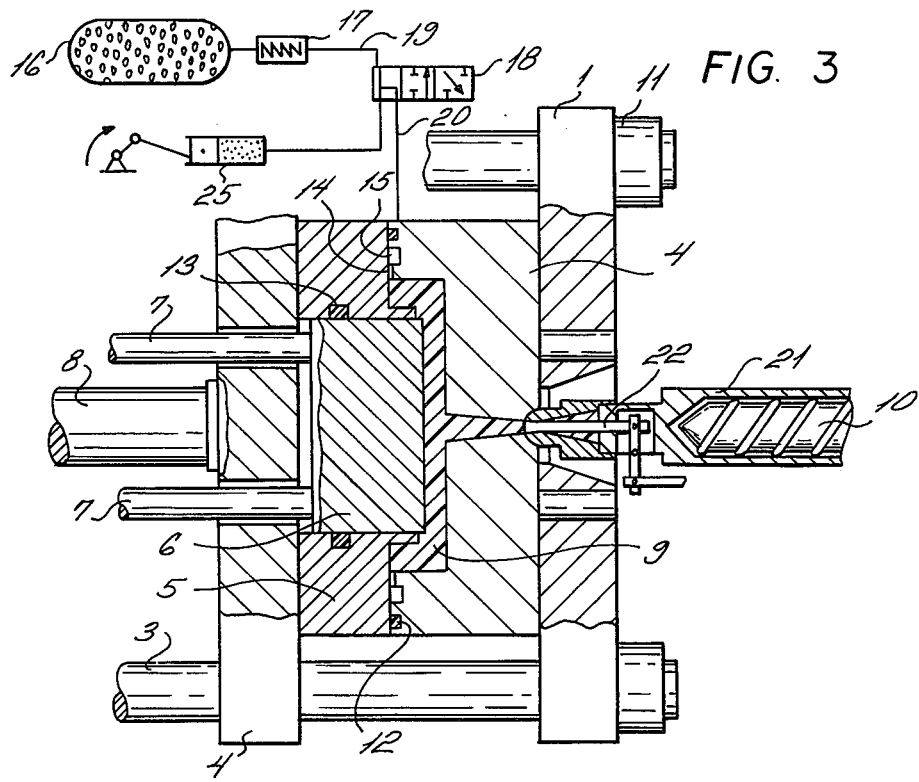
FIG. 3 shows the same mold in the third phase of the method, i.e. pressing of the foamable material to achieve the total filling of the mould cavity.

The third phase of the method, in accordance with the present invention as shown in FIG. 3, begins with the displacement of the movable shape-forming element 6 forward under the action of rods 7, pressing of the foamable material until it completely fills the mold pushing out the remaining part of the gas in the gas reservoir 16. After the complete filling of the mold cavity 9, the gas remaining in the channels 14 and 15 is released into the ambient atmosphere by switching the valve 18.

Figure 4:
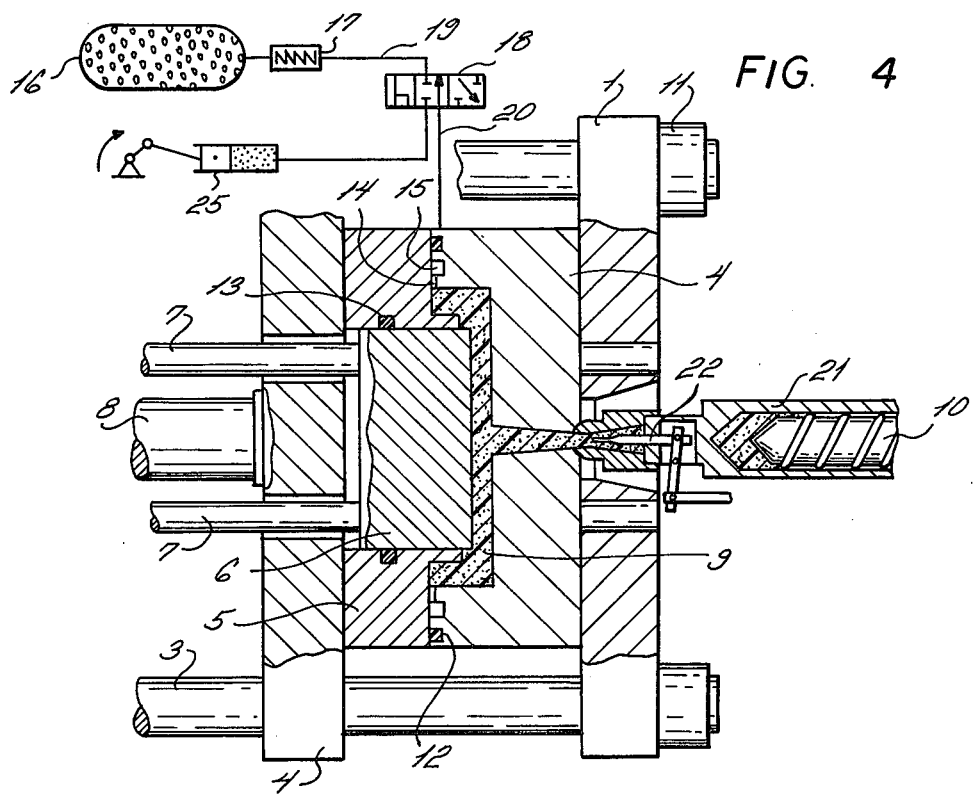
FIG. 4 shows the mould in the fourth phase of the method, i.e. foaming in the core of the moulded article as a result of the egression of part of the foamable material back in the injection cylinder.

After a predetermined time, necessary for the formation of the desired skin of the molded article, the shut-off valve 22 is again opened, thus connecting the mold cavity 9 with the injection cylinder 21. Under the action of the pressure of the blowing agent, part of the foaming material egresses (recedes) from the core of the molded article back into the injection cylinder. This terminates the fourth phase of the method, the final instant of which is shown in FIG. 4.

Figure 5:
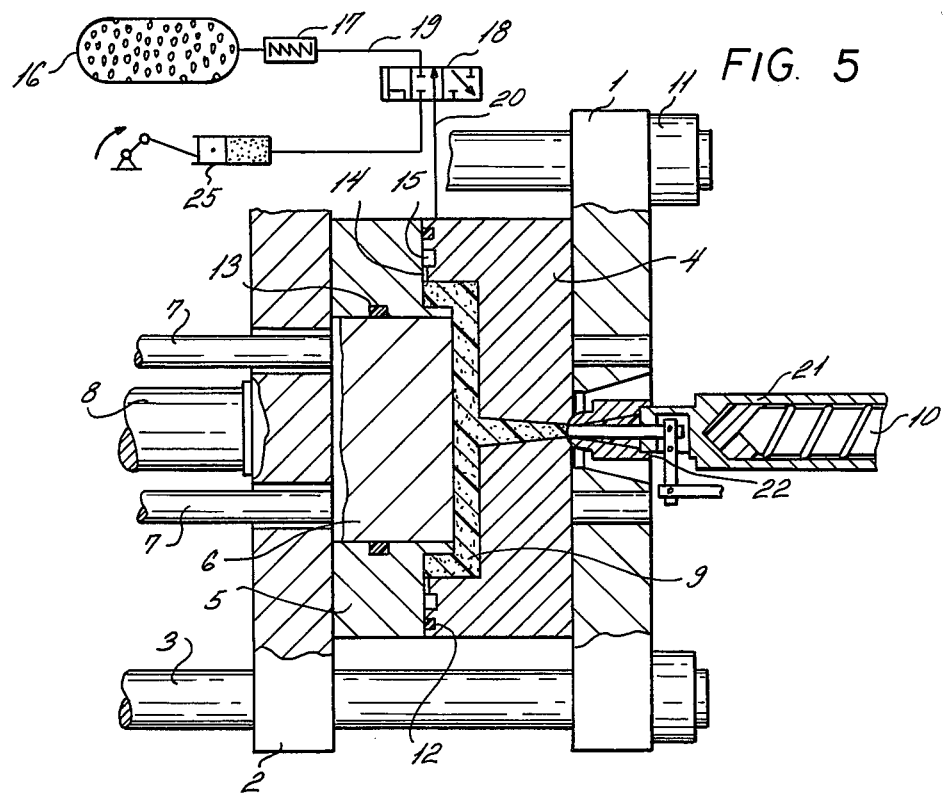
FIG. 5 shows the same mold in the fifth phase of the method, i.e. foaming in the core of the moulded article as a result of the retraction of the movable shape-forming elements.

The fifth phase of the method, in accordance with the present invention, begins with the pulling of the movable shape-forming element 6 in a position, corresponding to the sizes of the end-product. Under the action of said pressure of the blowing agent, the foamable material in the core of the molded article expands and fills the volume made free by the pulling back of the movable shape-forming element 6. The molded article is cooled until complete solidification. The final moment of this phase is shown in FIG. 5. Meanwhile, in cylinder 21 the foamable material for the next cycle is being prepared.

If necessary, the preparation of part of the foamable material in the injection cylinder can be carried out simultaneously with the pulling back of the movable shape-forming element.

Figure 6:
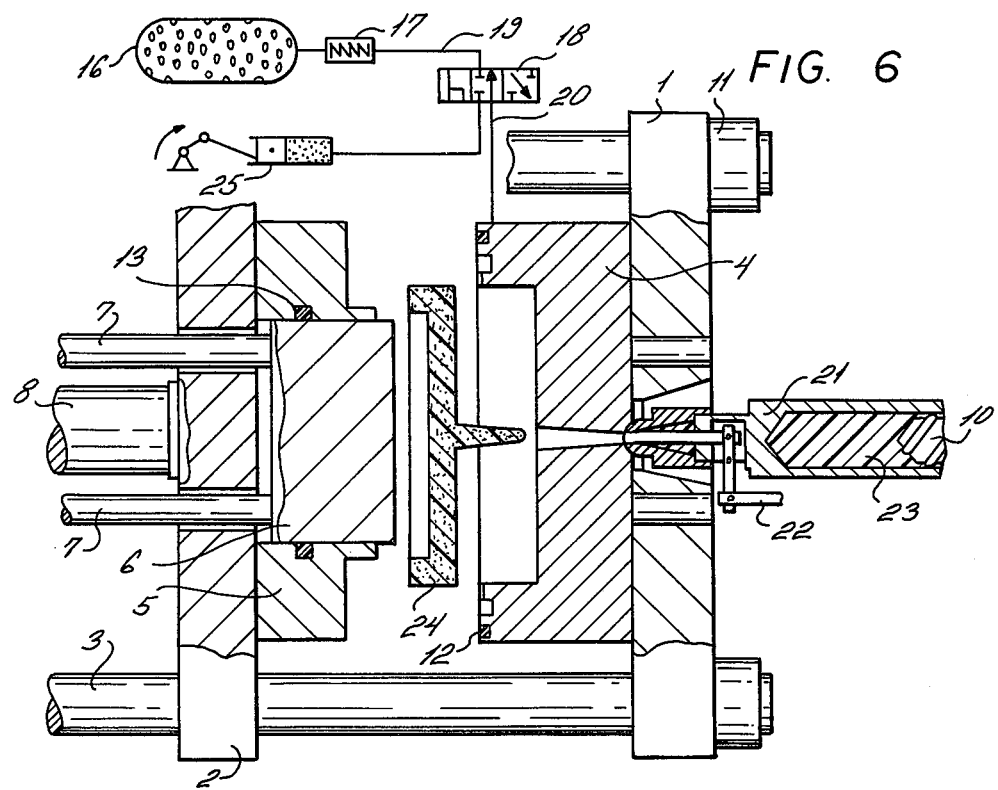
FIG. 6 shows the same mold at the end of the process after the cooling and the ejection of the molded article.

FIG. 6 shows the last phase of the step of opening the mold and the ejection of the molded article 24. In some cases it is possible to use the movable shape-forming elements for the ejection of the molded article 24 by additionally switching-on the pressing system.

Depending on the type of the molded article, it is possible to omit some of the phases of the method of the invention. For example, when molding thick-walled articles of small cross-sectional area, the movable shape-forming elements can remain in forward position during the filling of the mould cavity, when in the aforedescribed way there are effected the production of a counter-pressure, the injection and the foaming, i.e. the pressing of the resin to fill the cavity of the shape-forming elements can be eliminated.

Figure 7:
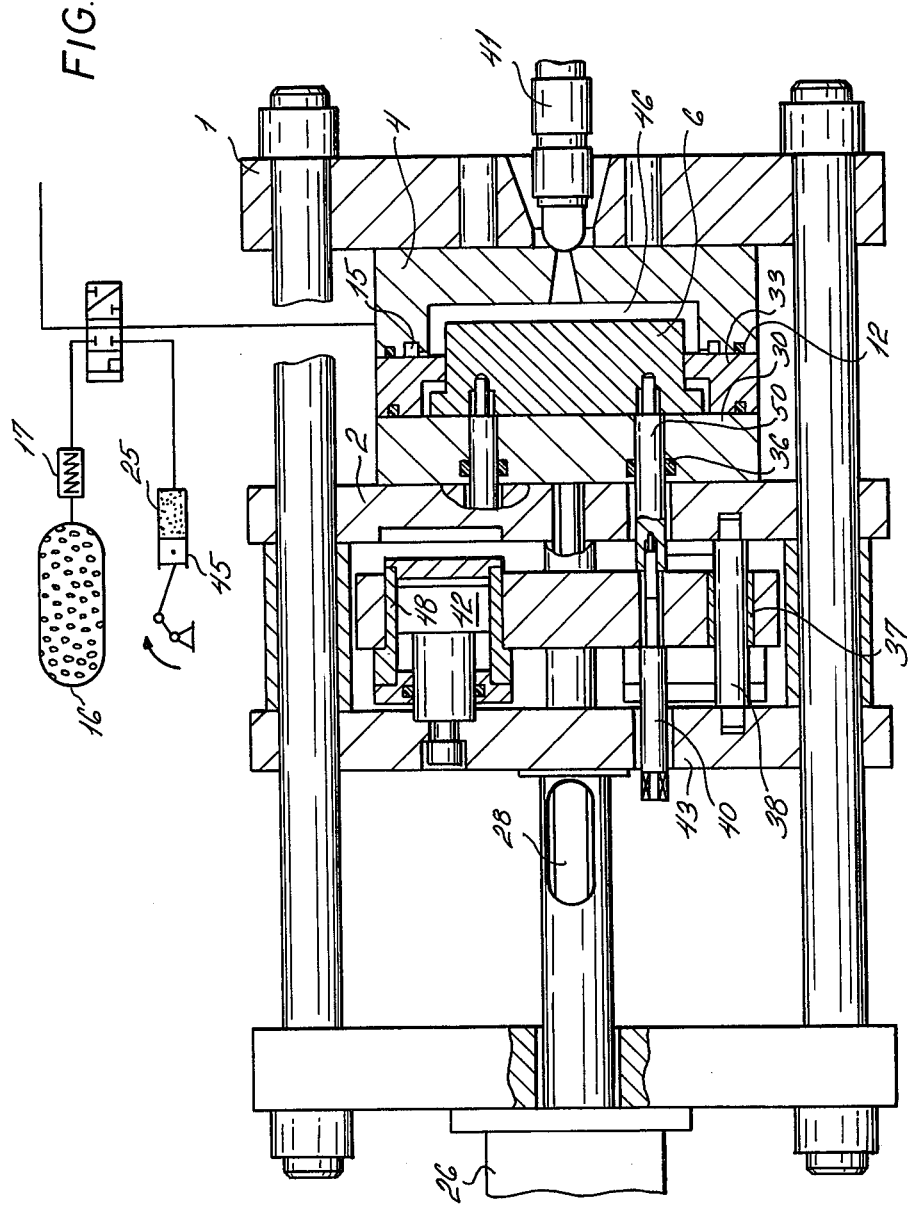
FIG. 7 is a partial vertical cross-sectional view of the device for pressing and retracting the movable shape-forming elements in the case when these device is attached to the movable plate of the system for closing and opening the mold.

There can be different embodiments of the device to effect the method in accordance with the present invention. FIG. 7 shows a preferred embodiment of a device to effect the method of the invention, in which the aforementioned elements are attached to the movable plate of the machine.

The device comprises a unit 41 for the preparation and injection of the foamable material 41, a mold 46, a system 26 for opening and closing the mold 26, a system for producing a gas counter-pressure, an ejection system 28 and a pressing system 42.

The system 17 for producing the gas counter-pressure comprises elements for heating the gas and elements, 45 for producing oscillations in the gas pressure are determined as to amplitude and frequency.

The pressing system 42 is disposed between two plates 2 and 43 which are rigidly interconnected, and hold the movable half-mold. This system comprises two hydraulic cylinders 48, rigidly connected to the pressing plate 37, which itself is guided by the columns 38. The piston rods 42 of the hydraulic cylinders 48 are rigidly connected to plate 43.

The mould 46 comprises a fixed half-mold 4 and a movable half-mold, the latter comprising a base plate 30, an ejection plate 33 and a movable shape-forming element 6. The mold is provided with grooves 15 for the delivery and the release of gas, and seals 12 and 36.

The movable shape-forming element 6 is rigidly connected by means of the screws 40 to the pressing plate 37 and can move together with it, thus pressing the foamable material injected into the mould cavity; the shape-forming element also can be pulled back, thus providing conditions for foaming in the core of the molded article.

The pressing system can be disposed also on the side of the fixed plate 1 of the machine. In this case, too, the pressing system can be driven by one or more cylinders in a manner analogous to that represented in FIG. 7.

Figure 8:
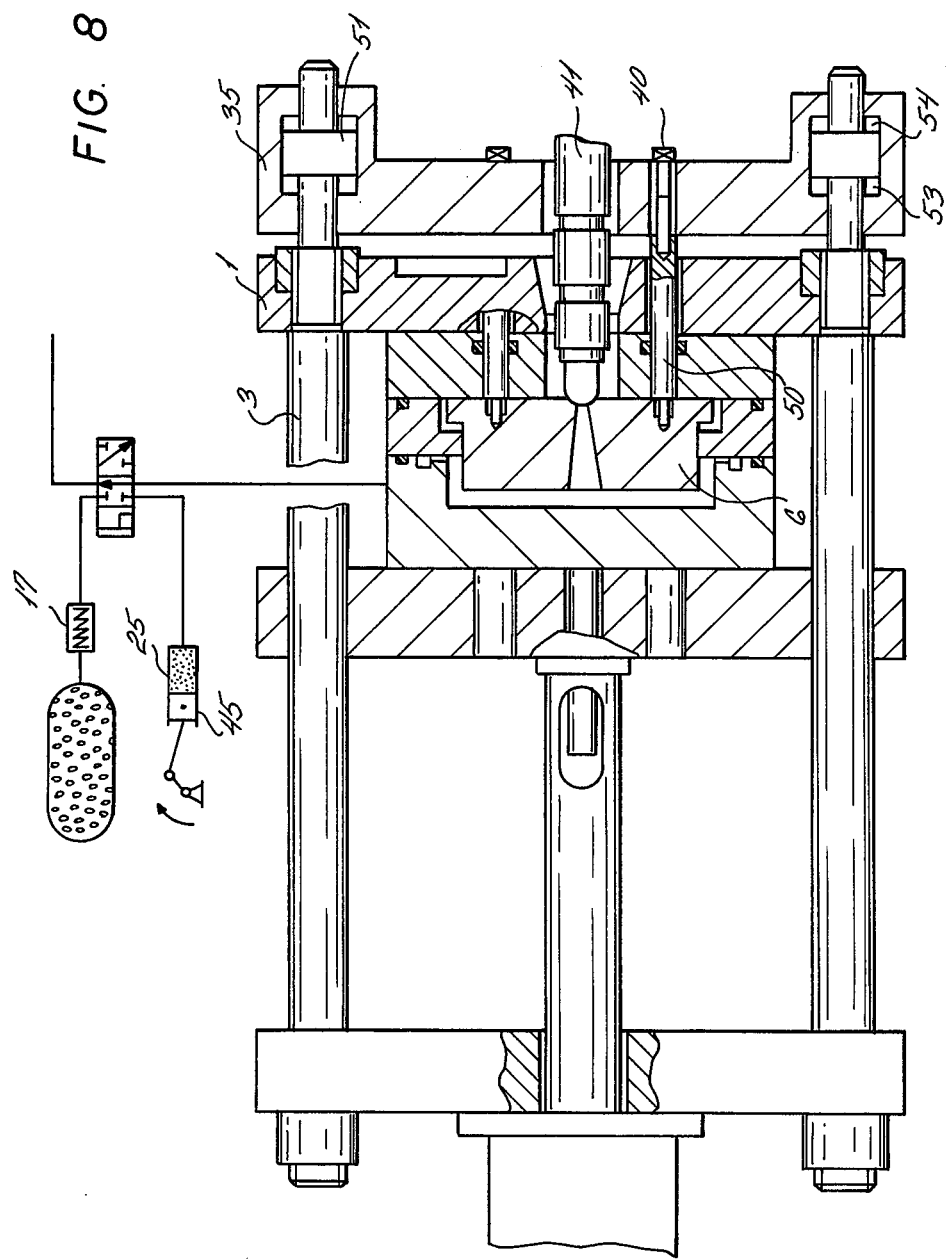
FIG. 8 is a partial vertical cross-sectional view of the device for pressing and retracting the movable shape-forming elements in the case when these devices are attached to the fixed plate.

FIG. 8 shows as an example the disposition of the pressing system perpendicular to the axis of the machine, on the side of the injection system 41. The pressing system comprises a pressing plate 35, which is movable with respect to the axis of the machine, and a piston 51, which is rigidly fixed to the columns 3 of the machine. The movable shape-forming element 6 is connected rigidly by means of screws 40 and extenders 50 to the pressing plate 35 and can be moved together with the latter, thus pressing the foamable material injected into the mold cavity, or it can be pulled back, thus providing conditions for foaming inside the molded article.

In the opposite case, when effecting the different phases of the method of the invention, if necessary, the connection between the injection system 41 and the shape-forming element is not interrupted.

The device to effect the method of the present invention can also be used for injection molding of compact (i.e. noncellular) articles, and then the volume of the mould cavity in the beginning of injection is usually greater than the final volume of the mold, determining the ultimate shape of the article.

What we claim is:

1. A method of producing a molded foamed article having a predetermined shape and volume with a smooth noncellular skin and cellular core from a foamable injection-moldable thermoplastic resin material containing a blowing agent, comprising the steps of:
    (a) closing a mold and defining thereby a mold cavity having a variable volume;
    (b) heating a gas to a temperature higher than that of said mold;
    (c) introducing said gas into said cavity at a pressure higher than the partial pressure of the gaseous products evolved upon the decomposition of said blowing agent and lower than the injection pressure of said materials;
    (d) pulsing said gas in said cavity;
    (e) injecting said material from an injection cylinder into said cavity against said gas pressure and occupying a portion of the volume thereof;
    (f) projecting a shape-forming element forming a major part of one wall of said cavity into said cavity against said material to thereby reduce the volume of said cavity and press said material to occupy said cavity entirely;

(g) permitting said material in contact with the walls of said cavity to form a skin;

(h) retracting said shape-forming element from its projected position and allowing said material to expand to the full volume of said cavity;

(i) permitting the fully-expanded material to harden; and (j) opening said mold and ejecting the molded article from said cavity by advancing said element.

2. The method defined in claim 1 wherein:

prior to the injection of said material in step (e), said shape-forming element is advanced into said cavity thereby reducing the volume thereof, said method further comprising the steps of injecting said material into said cavity and filling the reduced volume thereof and retracting said shape-forming element to allow the expansion of said material to the full volume of said cavity.

3. The method defined in claim 1, further comprising the step of interrupting the pulsing of said gas in step (d) during the expansion of said material, said expansion being induced at least in part by permitting said material in said cavity to recede into said injection cylinder.

4. The method defined in claim 3 wherein after a portion of said material recedes into said injection cylinder, said cylinder is disconnected from said mold cavity and step (h) is carried out.

5. The method defined in claim 1 wherein the pulsing of said gas in step (d) is interrupted prior to retraction of said shape-forming element in step (h).

6. The method defined in claim 1 wherein egression of a portion of said material from said cavity is permitted upon retraction of said shape-forming element in step (h) to permit expansion of said material.

* * * * *